(12) United States Patent
Zhu et al.

(10) Patent No.: US 10,387,852 B2
(45) Date of Patent: Aug. 20, 2019

(54) MAKING A PAYMENT USING A PAYMENT PLUG-IN

(71) Applicant: Alibaba Group Holding Limited, George Town (KY)

(72) Inventors: Yinjia Zhu, Hangzhou (CN); Xuefeng Lv, Lasa (CN); Wei Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 1191 days.

(21) Appl. No.: 13/711,996

(22) Filed: Dec. 12, 2012

(65) Prior Publication Data

US 2013/0151414 A1    Jun. 13, 2013

(30) Foreign Application Priority Data

Dec. 13, 2011    (CN) .......................... 2011 1 0415503

(51) Int. Cl.
*G06Q 20/08*    (2012.01)
*G06Q 20/34*    (2012.01)
*G06Q 20/32*    (2012.01)
*G06Q 20/40*    (2012.01)
*G06Q 20/42*    (2012.01)

(52) U.S. Cl.
CPC .......... *G06Q 20/08* (2013.01); *G06Q 20/322* (2013.01); *G06Q 20/3552* (2013.01); *G06Q 20/4014* (2013.01); *G06Q 20/42* (2013.01); *G06Q 2220/123* (2013.01)

(58) Field of Classification Search
USPC ...................................................... 705/1.1
See application file for complete search history.

(56) References Cited

U.S. PATENT DOCUMENTS

| 6,102,287 | A | 8/2000 | Matyas et al. |
| 8,290,433 | B2 * | 10/2012 | Fisher .................... G06Q 20/32 455/41.1 |
| 9,225,511 | B1 * | 12/2015 | Wharton .................. H04L 9/00 |

(Continued)

FOREIGN PATENT DOCUMENTS

| CN | 1716295 | 1/2006 |
| CN | 101009005 | 8/2007 |

(Continued)

OTHER PUBLICATIONS https://developer.paypal.com/docs/classic/fmf/integration-guide/FMFIntro/.*

(Continued)

*Primary Examiner* — Mamon Obeid
*Assistant Examiner* — El Mehdi Oussir
(74) *Attorney, Agent, or Firm* — Van Pelt, Yi & James LLP (57) ABSTRACT

Making a payment using a payment plug-in is disclosed, including: receiving a payment request from a device; receiving an indication that the payment plug-in is not installed at the device; determining that the device has received the payment plug-in, wherein the payment plug-in is configured to be installed at the device; receiving an activation message from the payment plug-in, the activation message including at least an attribute associated with the device; determining a stored user account that matches the attribute associated with the device; and receiving from the payment plug-in a confirmation to process the payment request based at least in part on the matching user account.

17 Claims, 4 Drawing Sheets

(56) References Cited

U.S. PATENT DOCUMENTS

| | | | |
|---|---|---|---|
| 9,811,655 B2* | 11/2017 | Qian | H04L 63/10 |
| 2003/0065805 A1* | 4/2003 | Barnes, Jr. | G06Q 10/02 |
| | | | 709/231 |
| 2005/0075137 A1* | 4/2005 | Reemtsma | G06Q 20/3552 |
| | | | 455/559 |
| 2007/0004391 A1* | 1/2007 | Maffeis | H04L 29/12594 |
| | | | 455/418 |
| 2007/0271149 A1* | 11/2007 | Siegel | G06Q 30/0603 |
| | | | 705/26.41 |
| 2009/0144161 A1* | 6/2009 | Fisher | H04W 4/21 |
| | | | 705/16 |
| 2009/0221269 A1* | 9/2009 | Bulmer | H04M 1/72525 |
| | | | 455/414.1 |
| 2009/0254440 A1* | 10/2009 | Pharris | G06Q 20/102 |
| | | | 705/17 |
| 2010/0005168 A1* | 1/2010 | Williams | G06T 11/60 |
| | | | 709/224 |
| 2010/0332351 A1* | 12/2010 | Stone | G06Q 20/102 |
| | | | 705/27.1 |
| 2011/0251892 A1* | 10/2011 | Laracey | G06Q 30/0253 |
| | | | 705/14.51 |
| 2011/0258301 A1* | 10/2011 | McCormick | H04L 67/34 |
| | | | 709/222 |
| 2012/0028618 A1* | 2/2012 | Goel | H04W 36/385 |
| | | | 455/414.1 |
| 2012/0036507 A1* | 2/2012 | Jonnala | G06Q 30/02 |
| | | | 717/178 |
| 2012/0109824 A1* | 5/2012 | Takatori | G06F 21/33 |
| | | | 705/44 |
| 2012/0158580 A1* | 6/2012 | Eram | G06Q 20/10 |
| | | | 705/39 |
| 2012/0191569 A1* | 7/2012 | Shah | G06O 30/0613 |
| | | | 705/26.41 |
| 2012/0310832 A1* | 12/2012 | Hammad | G06Q 10/087 |
| | | | 705/44 |
| 2013/0013498 A1* | 1/2013 | Fisher | G06Q 20/32 |
| | | | 705/40 |
| 2013/0073462 A1* | 3/2013 | Zanzot | G06Q 20/3223 |
| | | | 705/44 |
| 2013/0219454 A1* | 8/2013 | Hewinson | G06F 16/29 |
| | | | 726/1 |

FOREIGN PATENT DOCUMENTS

| | | |
|---|---|---|
| CN | 102117455 | 7/2011 |
| JP | 2002269479 | 9/2002 |
| JP | 2007058353 | 3/2007 |

OTHER PUBLICATIONS

Visa. (May 2011). Verified by Visa Acquirer and Merchant Implementation Guide . Retrieved from usa.visa.com: https://usa.visa.com/dam/VCOM/download/merchants/verified-by-visa-acquirer-merchant-implementation-guide.pdf (Year: 2011).*

Herzberg et al. "MiniPay: charging per click on the Web." Computer Networks and ISDN Systems 29.8 (1997): 939-951.

* cited by examiner

MAKING A PAYMENT USING A PAYMENT PLUG-IN

CROSS REFERENCE TO OTHER APPLICATIONS

This application claims priority to People's Republic of China Patent Application No. 201110415503.1 entitled A METHOD AND DEVICE TO REALIZE SECURE PAYMENT USING AN ELECTRONIC TERMINAL filed Dec. 13, 2011 which is incorporated herein by reference for all purposes.

FIELD OF THE INVENTION

The present application relates to the field of online security. In particular, it relates to a technique for making secure payments online.

BACKGROUND OF THE INVENTION

With the continuous development of network technology, activities such as web browsing, information searching, and payment transactions are no longer limited to laptop computers or desktop computers. Such activities may now be performed by logging onto wireless application protocol (WAP) webpages on mobile devices such as mobile phones or tablet devices.

However, traditional technologies of performing payment transactions using WAP webpages include at least the following shortcomings:

First, most traditional mobile device browsers are only able to access web pages. Therefore, conducting transactions using mobile device browsers must also be based on WAP webpages. In using WAP webpages, even with HTTPS secure web links, most mobile device browsers are unable to transmit accurate data to verify that the user who is using the device is in fact the user who is associated with the currently logged in account. Once a user's account information (e.g., login name and password) is stolen, payments made by logging into the stolen account on a mobile device other than the device of the user whose account was stolen will result in losses to that user.

Second, most traditional mobile device browsers make payments using WAP page prompts for the user's login name and password, which can lead to a cumbersome payment process for the user.

BRIEF DESCRIPTION OF THE DRAWINGS

Various embodiments of the invention are disclosed in the following detailed description and the accompanying drawings.

FIG. 1 is a diagram showing an embodiment of a system for making a payment using a payment plug-in.

FIG. 2 is a diagram showing an embodiment of a process for making a payment using a payment plug-in.

FIG. 4 is a diagram showing an embodiment of a system for making a payment using a payment plug-in.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A detailed explanation of the main principles in light of the attached drawings is provided below whereby technical solutions are realized in embodiments of the present application, the specific embodiments, and the corresponding beneficial effects that can be achieved therefrom.

Making a payment using a payment plug-in is described herein. In some embodiments, a plug-in is implemented and installed on an end user device (e.g., a smart phone, a tablet device, a personal computer, or the like). The plug-in cooperates with the web browser application at the end user device and enables secure payments. A payment request is received from a device. For example, the payment request is sent on behalf of a user using the device who selected to make a payment for a product for sale at a website. In some embodiments, initially, it is determined whether the plug-in has been installed at the device. If not, the plug-in is sent to the device to be installed. The plug-in sends an activation message to a payment server during an activation phase, wherein the activation message includes at least an attribute associated with the device. The attribute is stored on the server side, along with other user account information. Subsequently, when the user attempts to make payments via the plug-in, attribute information associated with the device is sent to the payment server, which determines whether there is a stored user account that matches the attribute associated with the device. If a matching account is found and a confirmation to process the payment is made by the user, the payment is processed.

Figure 1:
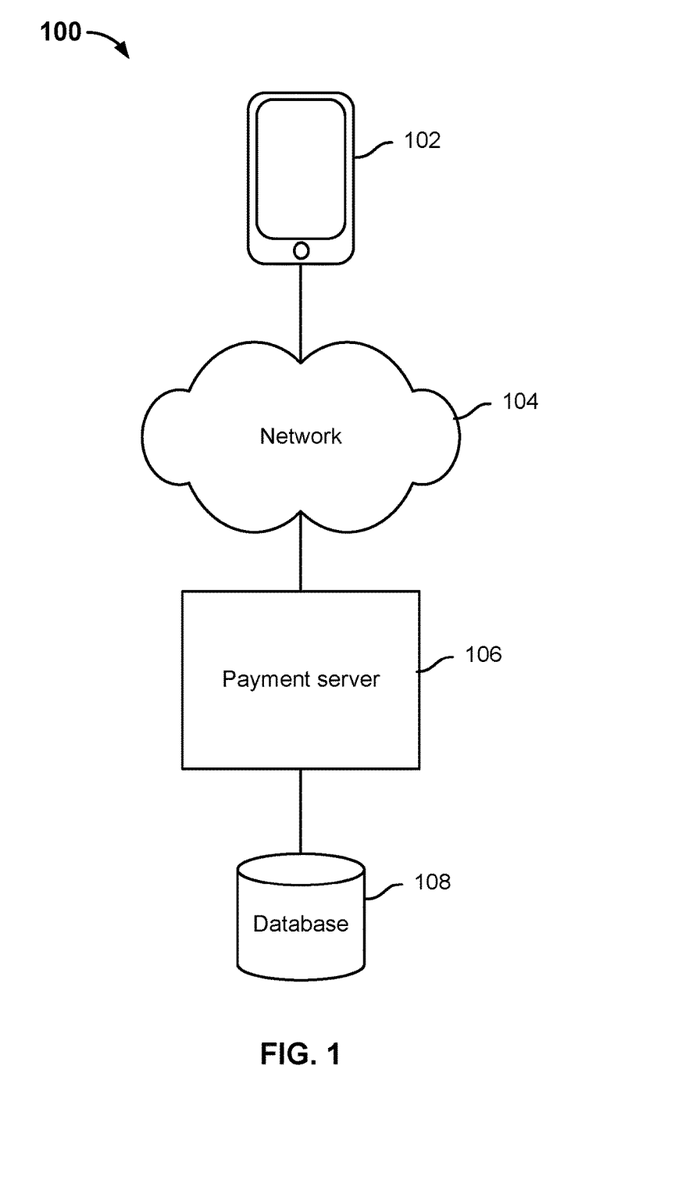

FIG. 1 is a diagram showing an embodiment of a system for making a payment using a payment plug-in. In the example, system 100 includes device 102, network 104, payment server 106, and database 108. Network 104 may include high speed data and/or telecommunication networks. Device 102 communicates with payment server 106 over network 104.

Examples of device 102 may include a mobile phone, a tablet device, a laptop computer, a desktop computer, and/or any other computing device. In various embodiments, a web browser application is installed at device 102 that a user may use to browse websites. For example, a user may browse an e-commerce website supported by one or more web servers (not shown) associated with payment server 106. While browsing, the user may arrive at a webpage associated with a product that the user wishes to buy. The user may select a "Make Payment" button located at the webpage. In response to the user's selection of the "Make Payment" button, a payment request is sent from device 102 to payment server 106. In some embodiments, the web browser at device 102 determines whether a payment plug-in associated with making secure payments via payment server 106 has been installed at device 102. In various embodiments, the payment plug-in comprises an application (e.g., that is configured to work with another application such as a web browser) to authenticate the device on which it is installed and facilitate a secure payment using the device. In some embodiments, the web browser has been specially configured or modified with certain computer code to cause the web browser to detect one or more tags associated with invoking the payment plug-in. In some embodiments, if an error/exception or other action associated with an absence of the payment plug-in at device 102 occurs in response to invocation of the payment plug-in, then the web browser may send an indication to payment server 106 denoting that the payment plug-in is not installed at device 102. In response to such an indication, payment server 106 is configured to prompt device 102 to invite the user to download the payment plug-in. In the event that the user selects an element associated with downloading the payment plug-in, payment server 106 is then configured to send the payment plug-in to device 102. In some embodiments, the downloaded payment plug-in is automatically installed at device 102.

At device 102, the newly installed payment plug-in is configured to automatically send an activation message to payment server 106. In various embodiments, the activation message (e.g., a text message) may include at least one attribute associated with device 102. Examples of attributes associated with device 102 may include: the phone number associated with the device, the subscriber identity module (SIM) card number, the device serial number, the device manufacturer, the device model identifier, and the device brand. The attribute information can be obtained by invoking Application Programming Interface (API) calls. Payment server 106 is configured to extract the attribute(s) from the received activation message and compare them against various stored user accounts. For example, each user account is associated with a registered user at the e-commerce website and includes information submitted by the user to create the account. During the user account creation process, the website may have requested one or more attributes associated with devices that the user might use to purchase products at the website. As such, payment server 106 is configured to find any stored user accounts that match the attribute(s) associated with the device. If a matching user account can be found, then device 102 is authenticated and is bound to the matching user account. For example, binding device 102 to the matching user account includes recording a corresponding relationship between device 102 and the user account. The payment plug-in that is installed at device 102 may receive a selection from the user to confirm the payment. Then, the payment plug-in is configured to send the confirmation to payment server 106 and payment server 106 is configured to process the payment request based at least in part on the user account bound to device 102.

By using the payment plug-in, the user may proceed with the desired payment using an authenticated device. Confirming the payment using the payment plug-in at the authenticated device will avoid the security risks associated with sending sensitive information over webpages.

Figure 2:
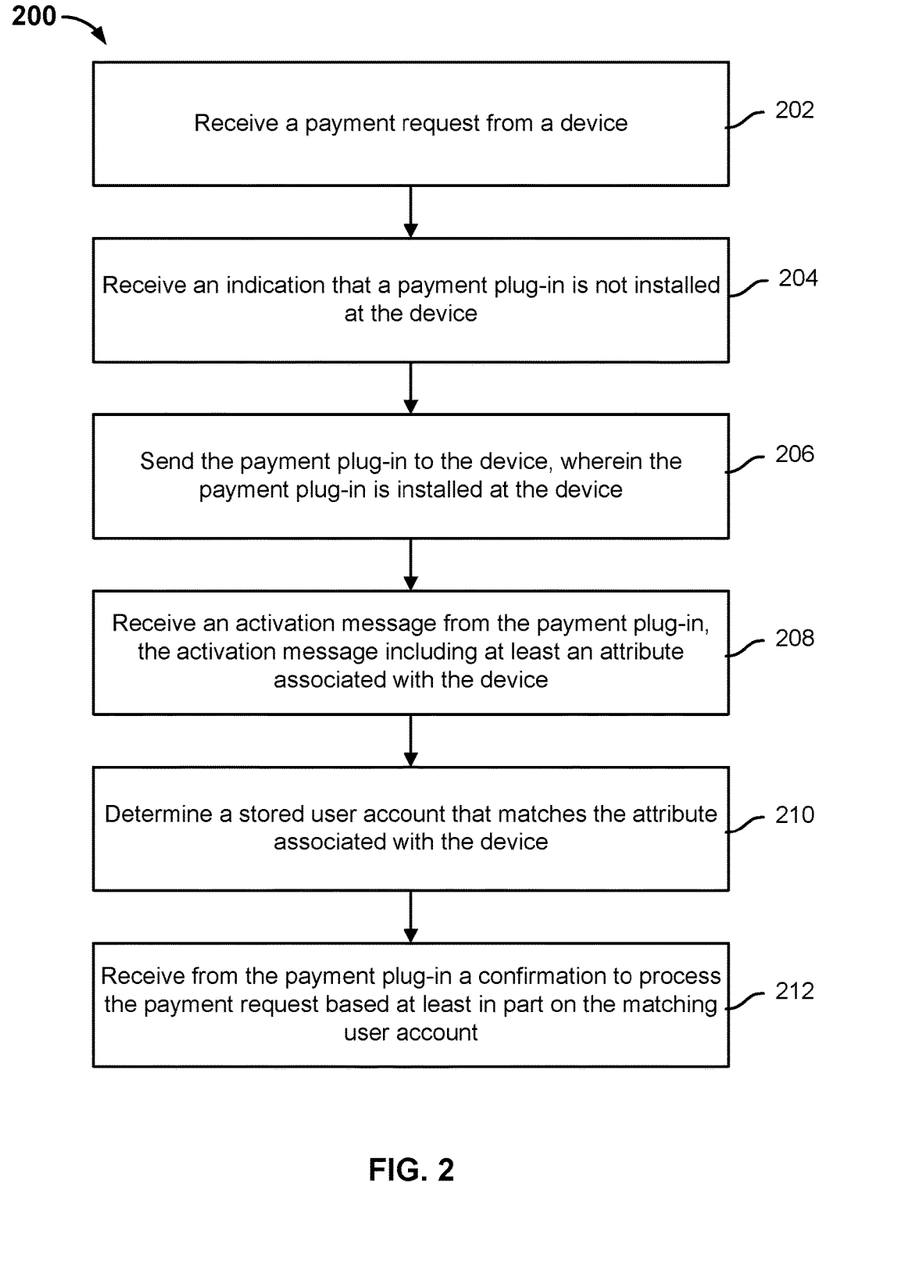

FIG. 2 is a diagram showing an embodiment of a process for making a payment using a payment plug-in. In some embodiments, process 200 may be implemented at a system such as system 100 of FIG. 1.

At 202, a payment request is received from a device. For example, the payment request may be received at a payment server such as payment server 106 of system 100 of FIG. 1. For example, a user may be browsing an e-commerce website using a mobile device and decides to purchase a product advertised at the website. For example, the mobile device may comprise a mobile phone or a tablet device. The user may be browsing the e-commerce website using a web browser application that is installed at the device. To initiate the purchase process, the user may select a "Make Payment" button at a webpage associated with the desired product. In response to the user's selection of the "Make Payment" button, a payment request is sent. For example, the payment request may include information associated with the user, the payment amount (e.g., the price of the desired product), and information associated with the desired product.

At 204, an indication that a payment plug-in is not installed at the device is received. In some embodiments, it is determined whether the payment plug-in is already installed with a web browser at the device. In various embodiments, the payment plug-in is configured to facilitate a secure and efficient payment process by at least associating the device with a stored user account such that, for example, a payment may be prevented from being made using payment information (e.g., credit card information) stored with the associated user account at another device that is not associated with the user account, as will be further described below.

In some embodiments, whether the payment plug-in is installed at the device is determined by the web browser application used by the user. In some embodiments, a web browser may be specially configured to invoke the payment plug-in by virtue of being modified to include certain computer code. For example, such computer code will be executed in response to a user's selection of a "Make Payment" button at a webpage and will cause the web browser to determine whether a tag configured to invoke the payment plug-in is associated with the selected button. If the web browser has been modified to detect such a tag, then the tag may be used to invoke the payment plug-in, where the payment plug-in is to be opened if the plug-in were installed, but if the payment plug-in were not installed, then the web browser may send an indication associated with the determination that the payment plug-in has not yet been installed. In some embodiments, the tag is associated with a secure link through which the payment plug-in may be downloaded. For example, below is an example of such a computer code:

```
<!--ALIPAYMSP[v="1.0"&submit_img_url=
"http://mobile.alipay.com/msplogo.png"][partner=
"2088002007260245"&seller="2088002007260245"&out_trade_no=
"500000006548"&subject="Product name"&body=
"Productdescription"&total_fee="30"&notify_url=
"http://notify.java.jpxx.org/index.jsp"&sign=
```

-continued

```
"kU2Fa3x6V985g8ayTozI1eJ5fHtm8%2FJGeJQf9in%-
2BcVmRJjHaExbirnGGKJ%2F7B63drqc4Kjlk%2FSg6vtSIkOtdvVBr-
RDpYaKxXVqkJTzRYgUwrrpMudbIj9aMS2O3dHG0GpyL4Zb6jKDY-
XHabGG0aBJY3QA7JuTJ23t6SqV%2B5f1xg%3D"&sign_type=
"MD5"]-->
```

In this example, the web browser includes code that detects the special comment tag. When the comment tag is encountered, the web browser determines whether a plug-in can be invoked or should be installed.

At 206, the payment plug-in is sent to the device, wherein the payment plug-in is installed at the device. In some embodiments, if it is determined that the payment plug-in is not already installed at the device, then a prompt is sent to the device and presented to the user to ask whether the user wishes to download the payment plug-in. For example, the prompt may appear as a popup message and a first selectable element (e.g., a first button) associated with agreeing to download the payment plug-in and a second selectable element (e.g., a second button) associated with refusing to download the payment plug-in are presented in association with the message. In the event that the user selects the element associated with agreeing to download the payment plug-in, then the payment plug-in is downloaded/sent to the device. In some embodiments, the payment plug-in may be sent by the payment server or another server. In some embodiments, the downloaded payment plug-in is automatically installed on the device.

However, in the event that the user selects the element associated with refusing to download the payment plug-in, the payment plug-in is then not downloaded/sent to the device and the payment request will be processed using one or more traditional webpage-based processes, which will not be further described.

At 208, an activation message from the payment plug-in is received, the activation message including at least an attribute associated with the device. In some embodiments, to activate the payment plug-in, the recently downloaded payment plug-in is configured to automatically send an activation message to authenticate the device. In some embodiments, the activation message may comprise a text message (e.g., a short message service (SMS) message). In some embodiments, the activation message may include at least one attribute associated with the device. For example, attributes associated with the device may include: the phone number associated with the device, the subscriber identity module (SIM) card number, the device serial number, the device manufacturer, the device model identifier, and the device brand.

In some embodiments, at least some of the attribute(s) that are included in the activation message are ones that were previously requested from a user during an account creation process at the website. For example, to create a user account at the e-commerce website, information may be requested of the user such as one or more of the following: the user's name, address, contact information, login identification, login password, and payment information (e.g., credit card information, bank account information, and/or other payment fund information). Additionally, in this user account creation process, the user may be requested to provide information/attributes associated with at least one device that the user might use to access the website. For example, the user may be requested to provide one or more attributes such as, for example, the phone number associated with the device, the subscriber identity module (SIM) card number, the device serial number, the device manufacturer, the device model identifier, and the device brand for each of such devices. Once the user account is successfully created, the information provided by the user will be stored with the user account in a database associated with the payment server.

At 210, a stored user account that matches the attribute associated with the device is determined. In some embodiments, the activation message is parsed and the attribute(s) associated with the device are compared against the user accounts stored at the database. In the event that the attribute(s) match corresponding attribute(s) in one or more stored user accounts, each such user account is considered to be a matching user account.

For example, assume that two attributes were included in the activation message and such attributes were the phone number of (408) 555-0987 and the device model of iPhone® 5. Such attributes are compared against both the phone number and the device model of the stored user accounts and each of the one or more user accounts whose phone number matches (408) 555-0987 and whose device model matches iPhone® 5 comprises a matching user account.

In some embodiments, in the event that more than one matching user account is found, a prompt is sent to the device to invite the user to select one of the matching user accounts to use to handle the present payment request. In various embodiments, at least one set of payment information (e.g., credit card information, bank account information, and/or other payment fund information) is stored with each user account. As such, the selected matching user account is the user account whose associated set of payment information is to be used to handle the payment request. If there is more than one set of payment information for the selected matching user account, then another prompt may be sent to the device to invite the user to select the one set of payment information that the user wishes to use to handle the payment request.

In some embodiments, once a matching user account is determined and/or selected from multiple matching user accounts, the device is bound to that user account (e.g., a corresponding relationship is recorded between the device and the user account) and the payment plug-in installed on the device may be used to facilitate payments. In some embodiments, prior to binding the device to the user account, a further verification is performed. For example, the further verification may include prompting the user for the password of the matching user account. Then the payment plug-in can only be activated and the device bound to the matching user account if the user can provide the correct password.

However, in the event that the attributes are not found to match corresponding attribute(s) in any stored user accounts, then payment plug-in cannot be successfully activated and used to facilitate processing of the payment request.

In some embodiments, by finding a stored user account that includes attribute(s) that match those in the activation message, authentication is performed of the device to confirm that it is a device known to a user who had previously created a user account. Such verification could prevent a user from using an unauthorized device (i.e., a device whose attribute(s) are not stored with an established user account) from successfully activating the payment plug-in and using stored payment information to complete a payment request.

At 212, a confirmation to process the payment request based at least in part on the matching user account is received from the payment plug-in. In some embodiments, a user interface associated with the activated payment plug-in is presented at the device. For example, the user interface may include information associated with the payment request (e.g., the price of the product and/or other information associated with the product), information associated with the user (e.g., identifying information associated with the user), information associated with the seller (e.g., identifying information associated with the user and/or an amount of available funds/credit), a selectable element associated with confirming the payment to the seller, and a selectable element associated with cancelling the payment to the seller. In the event that the user selects the selectable element associated with confirming the payment, the payment is then successfully completed (e.g., assuming that the user's available funds/credit prior to the completion of the payment exceeded the price of the product), and at least the cost of the product is deducted from the user's available funds/credit.

In some embodiments, subsequent to the user selecting the selectable element associated with confirming the payment and prior to allowing the payment to complete, the size of the payment (e.g., the price of the desired product) is assessed. In some embodiments, if the size of the payment is less than or equal to a first threshold, then the payment is allowed to complete without requiring further action from the user. In some embodiments, if the size of the payment is greater than the first threshold but less than or equal to a second threshold (which is greater than the first threshold), then the user is prompted for the password associated with the bound user account and the payment is allowed to complete upon the condition that the user submits the correct password. However, if the user does not submit the correct password, then the payment is prevented from completing. In some embodiments, if the size of the payment is greater than the second threshold, then the payment plug-in is configured to automatically send a verification message (e.g., a text message) that includes at least one attribute of the device to confirm that the device is a device whose attribute(s) match to the user account through which the payment is to be made. Then, if the device can be verified again, the payment is allowed to complete.

In some embodiments, in response to a successful completion of the payment, the payment plug-in directs the web browser to a webpage associated with confirmation of the transaction and then the payment plug-in closes.

However, in the event that the user selects the selectable element associated with cancelling the payment, the payment does not complete.

Figure 3:
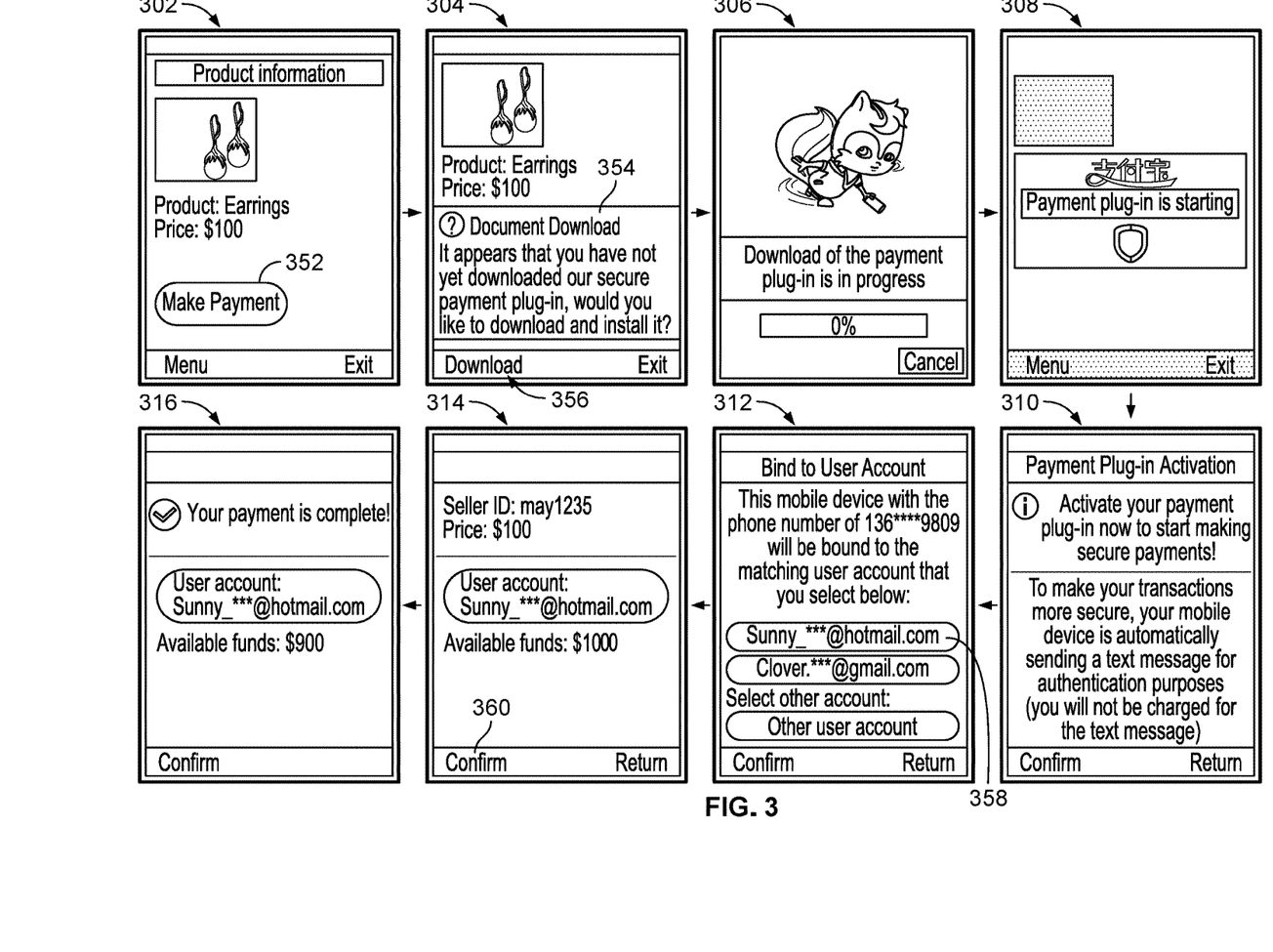
FIG. 3 shows a series of example user interfaces on a mobile device.

FIG. 3 shows a series of example user interfaces on a mobile device. As will be described below, user interfaces 302 through 316 show examples in which a payment plug-in is invoked to be used to facilitate an online payment made at the mobile device (e.g., a smart phone) using a process such as process 200 of FIG. 2. In various embodiments, user interfaces 302 through 316 are associated with a web browser application that is being used by the user of the device to browse an e-commerce website. User interface 302 shows a webpage associated with product information for a set of earrings that are on sale for $100. The user using the mobile device is interested in buying the earrings and thus selects "Make Payment" button 352. In response to the user's selection of "Make Payment" button 352, user interface 304 is presented. User interface 304 shows popup message 354, which informs the user that the mobile device does not have the payment plug-in installed and asks the user whether he would like to download and install the payment plug-in. The user chooses to download and install the payment plug-in and so selects "Download" link 356. In response to the user's selection of "Download" link 356, user interface 306 appears. User interface 306 shows a progress bar associated with the download of the payment plug-in. Once the download of the payment plug-in is completed, user interface 308 appears. User interface 308 includes a display indicating that the payment plug-in is being installed. After the payment plug-in is installed, user interface 310 appears. User interface 310 includes a display indicating that a text message is automatically being sent by the mobile device to the payment server to authenticate the mobile device. For example, the text message may include an attribute of the mobile device's such as the phone number. Sometime after sending the text message, user interface 312 appears. User interface 312 includes identifying information (emails) associated with two accounts, Sunny_*@hotmail.com and Clover.*@gmail.com, that have been determined to match the mobile phone number (136**9809) of the present mobile device. For example, Sunny_*@hotmail.com and Clover.*@gmail.com may be been determined because each user account includes a phone number that matches the mobile phone number (1369809) of the present mobile device. The user is prompted to select one of such user accounts to which to bind the mobile device. Alternatively, the user may also input another user account, if desired. In the example, the user selects button 358 associated with user account Sunny_*@hotmail.com to bind the mobile device to. In response to the user's selection of button 358, user interface 314 appears. User interface 314 includes information associated with the seller (the seller's ID is may1235), information associated with the price of the product ($100), the user account that is used to complete the transaction (the user account is identified by the email of Sunny_*@hotmail.com), and the available funds ($1000) associated with the user account identified by the email of Sunny_*@hotmail.com. In some embodiments, the user is also prompted to enter password information associated with the particular account she selected for additional authentication (not shown). In some embodiments, while not shown in this example, the user may be prompted to select among multiple sets of payment information (e.g., different credit card information, different bank accounts) associated with the bound user account prior to being shown user interface 314. To confirm payment of the $100 from the available funds, the user selects "Confirm" link 360. In response to the user's selection of "Confirm" link 360, user interface 316 appears. While not shown, the payment plug-in facilitates the completion of the payment. User interface 316 shows a webpage associated with a successful transaction and the remaining available funds ($900). For example, the purchased earrings may then be shipped to the user at an address associated with the bound user account identified by the email of Sunny_***@hotmail.com.

Figure 4:
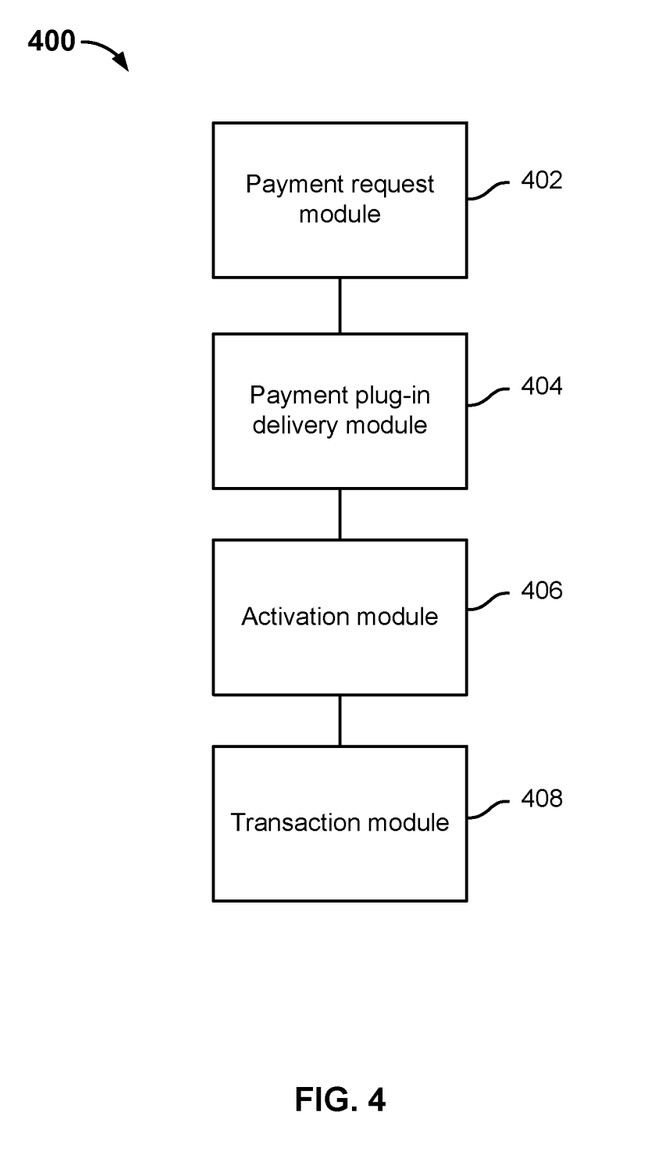

FIG. 4 is a diagram showing an embodiment of a system for making a payment using a payment plug-in. In the example, system 400 includes payment request module 402, payment plug-in delivery module 404, activation module 406, and transaction module 408. In some embodiments, payment server 106 of system 100 of FIG. 1 may be implemented with system 400.

The modules can be implemented as software components executing on one or more processors, as hardware such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Payment request module 402 is configured to receive a payment request from a device. For example, the device may comprise a mobile device such as a mobile phone or tablet device. Also for example, the payment request may comprise a request associated with a user's selection of a selectable element associated with buying a product that is for sale at a website.

Payment plug-in delivery module 404 is configured to receive an indication associated with whether the device from which the payment request was sent has a payment plug-in installed on it. In the event that the received indication denotes that the payment plug-in is not yet installed at the device, then payment plug-in delivery module 404 is configured to send a prompt message to the device, where the prompt message asks the user whether he agrees to download the payment plug-in. In the event that the user makes a selection associated with agreeing to download the payment plug-in, payment plug-in delivery module 404 is configured to send or payment plug-in delivery module 404 is configured to cause another entity to send the payment plug-in to the device. However, in the event that the received indication denotes that the payment plug-in is already installed at the device, then payment plug-in delivery module 404 is configured to not send the prompt message or the payment plug-in to the device.

Activation module 406 is configured to receive an activation message from a device that has recently installed the payment plug-in for the first time. In various embodiments, the activation message includes at least an attribute associated with the device. Activation module 406 is configured to compare the attribute(s) included in the activation message against stored user accounts to determine whether any stored user accounts include attribute(s) that match those of the activation. In the event that no matching user account may be found, then activation module 406 is configured to send an activation failure message to the device. Otherwise, in the event that one or more matching user accounts are found, then activation module 406 is configured to send some identifying information associated with each such matching user account to the device and then prompt the user to select one matching user account (if there is more than one matching user account) to bind the device to. Activation module 406 is configured to receive a user selection of a matching user account to which to bind the device to from the device and activation module 406 is configured to record a corresponding relationship between the selected matching user account and the device (or an attribute thereof).

Transaction module 408 is configured to process a payment request based on the user account that is bound to the device from which the payment request was sent. Transaction module 408 is configured to receive a confirmation to process the payment request from the device and in some embodiments, determine whether an available amount of funds associated with the bound user account is greater than or equal to the price of the product associated with the payment request. In the event that the available amount of funds associated with the bound user account is greater than or equal to the price of the product associated with the payment request, then transaction module 408 deducts the price of the product from the available funds, sends a message to the seller of the product informing him of the sale, and sends a webpage indicating a successful transaction to the device. However, in the event that the available amount of funds associated with the bound user account is less than the price of the product associated with the payment request, then transaction module 408 is configured to send a failed transaction message to the device.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A payment server, comprising:
one or more processors; and
one or more memories coupled with the one or more processors, wherein the one or more processors are configured with instructions which when executed cause the one or more processors to:
receive a payment request from a web browser associated with a device, wherein the payment request is generated based at least in part on a user selection of a control associated with a webpage that is presented by the web browser executing at the device;
in response to the payment request, receive from the web browser associated with the device, an indication that a payment plug-in associated with the payment server is not installed at the device;
in response to receiving the indication that the payment plug-in associated with the payment server is not installed at the device, send the payment plug-in associated with the payment server to the device, wherein the payment plug-in associated with the payment server is configured to work with the web browser associated with the device;
in response to the payment plug-in associated with the payment server being installed on the device, receive a first text message from the payment plug-in associated with the payment server, wherein the payment plug-in associated with the payment server is configured to automatically, without user intervention, send the first text message to the payment server in response to being installed at the device, wherein the first text message includes a first attribute associated with the device that is obtained by invoking an application programming interface (API) call;
determine the first attribute associated with the device from the first text message;
determine that a stored user account matches the first attribute associated with the device included in the first text message;
determine that the device is authenticated based at least in part on the first attribute associated with the device matching the stored user account;
determine that a size of a payment associated with the payment request is greater than a threshold;
in response to determining that the payment request is greater than the threshold, request a verification message from the payment plug-in;

receive a second text message from the payment plug-in associated with the payment server, wherein the second text message includes a second attribute associated with the device, wherein the second text message is automatically, without user intervention, sent by the payment plug-in associated with the payment server to the payment server;
determine that the device is verified based at least in part on the second attribute associated with the device; and
process the payment request.

2. The payment server of claim 1, wherein the first attribute associated with the device includes one or more of the following: a phone number associated with the device, a subscriber identity module (SIM) card number associated with the device, a device serial number, a device manufacturer, a device model identifier, or a device brand.

3. The payment server of claim 1, wherein the stored user account comprises one of a plurality of stored user accounts that matches the first attribute associated with the device.

4. The payment server of claim 1, wherein the one or more processors are further configured to process the payment request based at least in part on payment information associated with the stored user account.

5. A method, comprising:
receiving, at a payment server, a payment request from a web browser associated with a device, wherein the payment request is generated based at least in part on a user selection of a control associated with a webpage that is presented by a web browser executing at the device;
in response to the payment request, receiving, at the payment server from the web browser associated with the device, an indication that a payment plug-in associated with the payment server is not installed at the device;
in response to receiving the indication that the payment plug-in associated with the payment server is not installed at the device, sending the payment plug-in associated with the payment server to the device, wherein the payment plug-in associated with the payment server is configured to work with the web browser associated with the device;
in response to the payment plug-in associated with the payment server being installed on the device, receiving, at the payment server, a first text message from the payment plug-in associated with the payment server, wherein the payment plug-in associated with the payment server is configured to automatically, without user intervention, send the first text message to the payment server in response to being installed at the device, wherein the first text message includes a first attribute associated with the device that is obtained by invoking an application programming interface (API) call;
determining, at the payment server, the first attribute associated with the device from the first text message;
determining, at the payment server, that a stored user account matches the first attribute associated with the device included in the first text message;
determining, at the payment server, that the device is authenticated based at least in part on the first attribute associated with the device matching the stored user account;
determining, at the payment server, that a size of a payment associated with the payment request is greater than a threshold;
in response to determining that the payment request is greater than the threshold, requesting, at the payment server, a verification message from the payment plug-in;
receiving, at the payment server, a second text message from the payment plug-in associated with the payment server, wherein the second text message includes a second attribute associated with the device, wherein the second text message is automatically, without user intervention, sent by the payment plug-in associated with the payment server to the payment server;
determining, at the payment server, that the device is verified based at least in part on the second attribute associated with the device; and
processing the payment request.

6. The method of claim 5, wherein the indication that the payment plug-in is not installed at the device is determined based at least in part on a tag associated with the control associated with the webpage, wherein the tag is associated with a link associated with downloading the payment plug-in.

7. The method of claim 5, wherein the first attribute associated with the device includes one or more of the following: a phone number associated with the device, a subscriber identity module (SIM) card number associated with the device, a device serial number, a device manufacturer, a device model identifier, or a device brand.

8. A device, comprising:
one or more processors; and
one or more memories coupled with the one or more processors, wherein the one or more processors are configured with instructions which when executed cause the one or more processors to:
detect a user selection of a control associated with a webpage that is presented by a web browser associated with the device;
in response to the user selection, send a payment request to a payment server;
determine, by the device, using the web browser associated with the device, a tag associated with the control associated with the webpage that is configured to invoke a payment plug-in at the device;
invoke, by the device, using the web browser associated with the device, the payment plug-in associated with the payment server in the event that the payment plug-in associated with the payment server is installed at the device;
determine, by the device, using the web browser associated with the device, based at least in part on the tag associated with the control associated with the webpage that the payment plug-in is not installed at the device;
in response to the payment server receiving an indication that the payment plug-in associated with the payment server is not installed at the device, receive, the payment plug-in associated with the payment server, from the payment server, wherein the payment plug-in associated with the payment server is configured to work with the web browser associated with the device;
install the payment plug-in associated with the payment server at the device;
in response to the installation of the payment plug-in associated with the payment server at the device, automatically, without user intervention, send, from the device to the payment server, a first text message using the payment plug-in associated with the payment server, the first text message including a first attribute associated with the device, wherein the first attribute associated with the device is obtained by invoking an application programming interface (API) call, wherein the first text message comprises a Short Message Service (SMS) message;

receive, from the payment server, an indication that the device is authenticated based at least in part on the first attribute matching a stored user account;

receive a request for a verification message from the payment server, wherein the request for the verification message is sent in response to a determination by the payment server that a size of a payment associated with the payment request is greater than a threshold;

obtain, by utilizing the payment plug-in, a second attribute associated with the device;

automatically send, without user intervention, the verification message including the second attribute associated with the device to the payment server; and receive an indication from the payment server that the device is verified based at least in part on the second attribute associated with the device.

9. The device of claim 8, wherein the stored user account comprises a first stored user account and the one or more processors are further configured to:
receive information associated with a plurality of stored user accounts that matches the first attribute associated with the device; and
receive a user selection associated with the first stored user account from the plurality of stored user accounts.

10. A method, comprising:
detecting, at a device, a user selection of a control associated with a webpage that is presented by a web browser associated with the device;
in response to the user selection, sending, by the device, a payment request to a payment server;
determining, by the device, using the web browser associated with the device, based at least in part on the tag associated with the control associated with the webpage that a payment plug-in is not installed at the device;
in response to the payment server receiving an indication that the payment plug-in associated with the payment server is not installed at the device, receiving, at the device, the payment plug-in associated with the payment server, wherein the payment plug-in associated with the payment server is configured to work with the web browser associated with the device;
installing the payment plug-in associated with the payment server at the device;
in response to the installation of the payment plug-in associated with the payment server at the device, automatically, without user intervention, sending, from the device to the payment server, a first text message using the payment plug-in associated with the payment server, the first text message including a first attribute associated with the device, wherein the first attribute associated with the device is obtained by invoking an application programming interface (API) call, wherein the first text message comprises a Short Message Service (SMS) message;
receiving, at the device, from the payment server, an indication that the device is authenticated based at least in part on the first attribute matching stored user account;
receiving, at the device, a request for a verification message from the payment server, wherein the request for the verification message is sent in response to a determination, by the payment server, that a size of a payment associated with the payment request is greater than a threshold;
obtaining, by utilizing the payment plug-in, a second attribute associated with the device;
automatically sending, without user intervention, from the device, the verification message including the second attribute associated with the device to the payment server; and
receiving, at the device, an indication from the payment server that the device is verified based at least in part on the second attribute associated with the device.

11. The method of claim 10, wherein the stored user account comprises a first stored user account and further comprising:
receiving information associated with a plurality of stored user accounts that matches the first attribute associated with the device; and
receiving a user selection of the first stored user account from the plurality of stored user accounts.

12. The payment server of claim 1, wherein the one or more processors are configured with instructions which when executed cause the one or more processors further to:
receive, at a first time, new account information including at least the first attribute associated with the device and payment information; and
store at least the first attribute associated with the device and the payment information with the stored user account;
wherein the payment request is received from the device at a second time, wherein the first time is earlier than the second time.

13. The method of claim 5, further comprising:
receiving, at the payment server, at a first time, new account information including at least the first attribute associated with the device and payment information; and
storing, at the payment server, at least the first attribute associated with the device and the payment information with the stored user account;
wherein the payment request is received from the device at a second time, wherein the first time is earlier than the second time.

14. The device of claim 8, wherein the one or more processors are configured with instructions which when executed cause the one or more processors further to:
send, at a first time, to the payment server, new account information including at least the first attribute associated with the device and payment information, wherein at least the first attribute associated with the device and the payment information are stored with the stored user account;
wherein the payment request is sent from the device at a second time, wherein the first time is earlier than the second time.

15. The method of claim 10, further comprising:
sending, from the device, at a first time, to the payment server, new account information including the first attribute associated with the device and payment information, wherein at least the first attribute associated with the device and the payment information are stored with the stored user account;
wherein the payment request is sent from the device at a second time, wherein the first time is earlier than the second time.

16. The payment server of claim 1, wherein to determine the stored user account that matches the first attribute associated with the device comprises to:
   parse the first text message to obtain the first attribute associated with the device; and
   compare the first attribute associated with the device to a user account stored at a database.

17. The method of claim 5, wherein determining the stored user account that matches the first attribute associated with the device comprises:
   parsing, at the payment server, the first text message to obtain the first attribute associated with the device; and
   comparing, at the payment server, the first attribute associated with the device to a user account stored at a database.

\* \* \* \* \*

UNITED STATES PATENT AND TRADEMARK OFFICE
CERTIFICATE OF CORRECTION

PATENT NO.         : 10,387,852 B2
APPLICATION NO.    : 13/711996
DATED              : August 20, 2019
INVENTOR(S)        : Yinjia Zhu, Xuefeng Lv and Wei Li It is certified that error appears in the above-identified patent and that said Letters Patent is hereby corrected as shown below:

In page 2, Column 2, item (56), references cited, U.S. patent documents, cite no. 3, delete "G06O" and insert --G06Q--, therefor.

Signed and Sealed this
Seventeenth Day of March, 2020

Andrei Iancu
*Director of the United States Patent and Trademark Office*